US012640858B2

(12) United States Patent
Farmanbar et al.

(10) Patent No.: US 12,640,858 B2
(45) Date of Patent: May 26, 2026

(54) UNEQUAL DENSITY DEMODULATION REFERENCE SIGNAL POSITIONS

(71) Applicant: Dell Products L.P., Round Rock, TX (US)

(72) Inventors: Hamidreza Farmanbar, Ottawa (CA); Gwenael Poitau, Montreal (CA); Evgeny Paltin, Montreal (CA)

(73) Assignee: Dell Products L.P., Round Rock, TX (US)

( * ) Notice: Subject to any disclaimer, the term of this patent is extended or adjusted under 35 U.S.C. 154(b) by 263 days.

(21) Appl. No.: 18/488,839

(22) Filed: Oct. 17, 2023

(65) Prior Publication Data

US 2025/0125916 A1     Apr. 17, 2025

(51) Int. Cl.
H04L 5/00          (2006.01)
H04L 1/00          (2006.01)
(52) U.S. Cl.
CPC ............ H04L 5/0016 (2013.01); H04L 1/007 (2013.01); H04L 5/0007 (2013.01)
(58) Field of Classification Search
None
See application file for complete search history.

(56) References Cited

U.S. PATENT DOCUMENTS

| | | | |
|---|---|---|---|
| 12,218,874 B2 * | 2/2025 | Sun ..................... | H04L 25/0224 |
| 12,323,355 B2 * | 6/2025 | Zewail ................... | H04J 13/18 |
| 2010/0238877 A1 | 9/2010 | Nam et al. | |
| 2018/0367275 A1 | 12/2018 | Nammi et al. | |

(Continued)

FOREIGN PATENT DOCUMENTS

| | | |
|---|---|---|
| EP | 4 060 926 | 9/2022 |
| WO | 2021/245632 | 12/2021 |

(Continued)

OTHER PUBLICATIONS

Farmanbar et al. "Unequal Density Demodulation Reference Signal Positions" U.S. Appl. No. 18/316,877, filed May 12, 2023, 50 pages.

(Continued)

*Primary Examiner* — Phirin Sam
(74) *Attorney, Agent, or Firm* — Amin, Turocy & Watson, LLP

(57)          ABSTRACT

A system can receive a message from a base station configured to communicate via a group of antenna ports, the message being indicative of conducting uplink communications of broadband cellular communications with the base station according to a first group of differing demodulation reference signal densities, wherein respective demodulation reference signal densities of the group of differing demodulation reference signal densities correspond to respective antenna ports of the group of antenna ports, and wherein communicating the broadband cellular communications for uplink communications according to the first group of differing demodulation reference signal densities is performed independently of a second group of demodulation reference signal densities that is configured for downlink communications. The system can use the group of differing demodulation reference signal densities to further communicate the broadband cellular communications with the base station.

20 Claims, 14 Drawing Sheets

(56) References Cited

U.S. PATENT DOCUMENTS

| | | | |
|---|---|---|---|
| 2019/0052433 A1 | 2/2019 | Yoo et al. | |
| 2019/0069282 A1 | 2/2019 | Luo et al. | |
| 2019/0260454 A1 | 8/2019 | Lindbom et al. | |
| 2020/0083945 A1 | 3/2020 | Lindbom et al. | |
| 2020/0169441 A1 | 5/2020 | Xu et al. | |
| 2020/0328861 A1 | 10/2020 | Malladi et al. | |
| 2020/0336355 A1 | 10/2020 | Yamada et al. | |
| 2021/0067297 A1 | 3/2021 | Farmanbar et al. | |
| 2021/0091902 A1* | 3/2021 | Yamada | H04B 7/0617 |
| 2021/0143964 A1 | 5/2021 | Frenne et al. | |
| 2021/0144716 A1 | 5/2021 | Choi et al. | |
| 2021/0168777 A1* | 6/2021 | Kim | H04L 5/0051 |
| 2021/0320772 A1 | 10/2021 | Zewail et al. | |
| 2021/0376898 A1* | 12/2021 | Levitsky | H04W 24/10 |
| 2022/0104178 A1 | 3/2022 | Lee et al. | |
| 2022/0123869 A1 | 4/2022 | Legallais et al. | |
| 2022/0123896 A1 | 4/2022 | Taherzadeh Boroujeni et al. | |
| 2022/0216964 A1 | 7/2022 | Mondal et al. | |
| 2022/0311648 A1 | 9/2022 | Cheng et al. | |
| 2022/0368568 A1 | 11/2022 | Taherzadeh Boroujeni et al. | |
| 2023/0030162 A1 | 2/2023 | Ren et al. | |
| 2023/0094167 A1 | 3/2023 | Matsumura et al. | |
| 2023/0231683 A1* | 7/2023 | Ali | H04L 5/0051 |
| | | | 370/329 |
| 2023/0284065 A1 | 9/2023 | Zhou et al. | |
| 2024/0039671 A1 | 2/2024 | Abdelghaffar et al. | |
| 2024/0049227 A1* | 2/2024 | Jang | H04L 5/0094 |
| 2024/0250794 A1 | 7/2024 | Liu | |
| 2024/0380537 A1 | 11/2024 | Farmanbar et al. | |
| 2025/0125916 A1 | 4/2025 | Farmanbar et al. | |
| 2025/0125924 A1 | 4/2025 | Farmanbar et al. | |
| 2025/0125925 A1 | 4/2025 | Farmanbar et al. | |

FOREIGN PATENT DOCUMENTS

| | | |
|---|---|---|
| WO | 2023/287147 | 1/2023 |
| WO | 2024020963 | 2/2024 |
| WO | 2024068222 | 4/2024 |

OTHER PUBLICATIONS

Farmanbar et al. "Unequal Density Demodulation Reference Signal Positions" U.S. Appl. No. 18/488,818, filed Oct. 17, 2023, 52 pages.

Farmanbar et al. "Unequal Density Demodulation Reference Signal Positions" U.S. Appl. No. 18/488,829, filed Oct. 17, 2023, 50 pages.

International Search Report and Written Opinion mailed Feb. 26, 2024 for PCT Application No. PCT/US2023/036182, 81 pages.

Huawei et al: "Design of DMRS for DL/UL data transmission", 3GPP Draft; R1-1715472, RAN WGI, No. Nagoya, Japan; Sep. 17, 2017, [http://www.3gpp.org/ftp/Meetings_3GPP_ SYNC/RANI/Docs/], 16 pages.

CMCC: "Discussion on the PUSCH coverage enhancement", 3GPP Draft; R1-2008026, RAN WGI, No. e-Meeting; Nov. 1, 2020, [https://ftp.3gpp.org/tsg_ran/WG1_RL1/T SGR1_103-e/Docs/RI-2008026.zip RI-2008026.docx], 5 pages.

Office Action mailed Aug. 1, 2025 for U.S. Appl. No. 18/316,877, 116 pages.

Office Action mailed Sep. 29, 2025 for U.S. Appl. No. 18/488,829, 31 pages.

Office Action mailed Jan. 12, 2026 for U.S. Appl. No. 18/488,818, 39 pages.

Notice of Allowance mailed Jan. 6, 2026 for U.S. Appl. No. 18/316,877, 34 pages.

Notice of Allowance mailed Feb. 5, 2026 for U.S. Appl. No. 18/488,829, 23 pages.

Notification Concerning Transmittal of International Preliminary Report on Patentability mailed Nov. 27, 2025 for PCT Application No. PCT/US2023/036182, 9 pages.

European Office Action mailed Dec. 19, 2025 for European Patent Application No. 23813504.0, 3 pages.

* cited by examiner

100
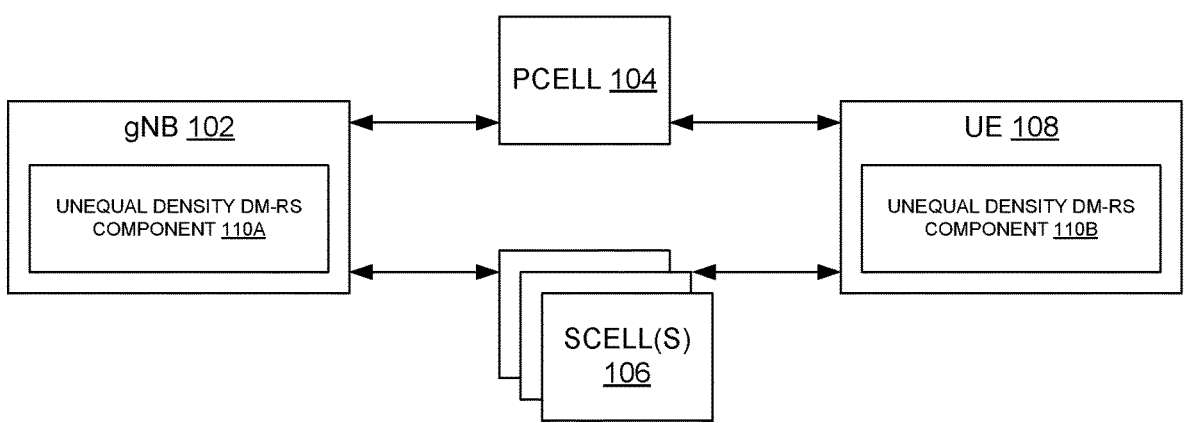
FIG. 1

200

DM-RS TIME FREQUENCY
LOCATIONS 202

SUBCARRIERS
204

OFDM SYMBOLS
206

UNEQUAL
DENSITY DM-RS
COMPONENT 210

KEY 208

DM-RS

DATA

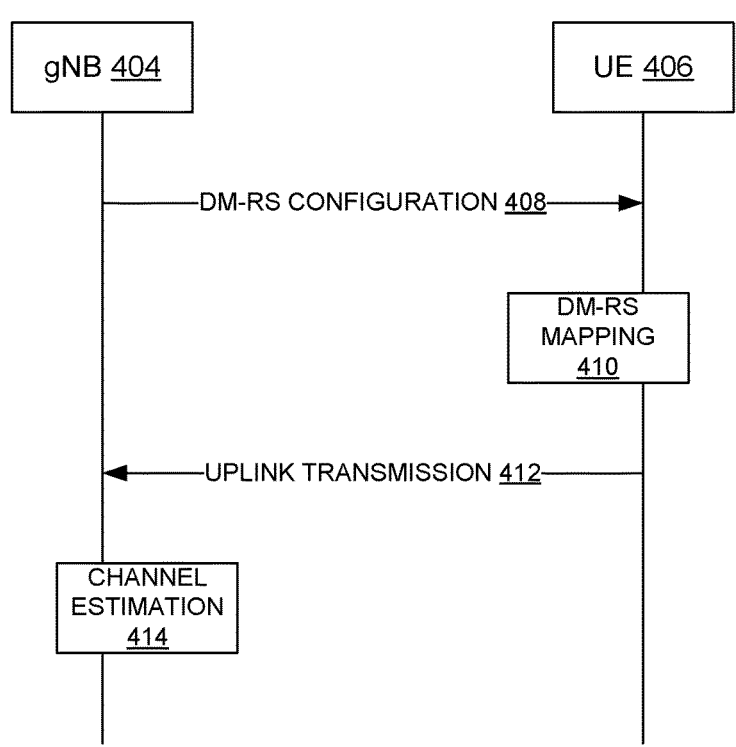
FIG. 4

700B

CDM GROUP 3 712C
(PORTS 1008-1011)

DM-RS TIME FREQUENCY
LOCATIONS 702C

SUBCARRIERS
704C

OFDM SYMBOLS
706C

1000

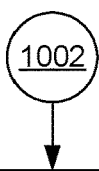

1002

RECEIVING A MESSAGE FROM A BASE STATION CONFIGURED TO COMMUNICATE VIA A GROUP OF ANTENNA PORTS, THE MESSAGE BEING INDICATIVE OF CONDUCTING UPLINK COMMUNICATIONS OF BROADBAND CELLULAR COMMUNICATIONS WITH THE BASE STATION ACCORDING TO A FIRST GROUP OF DIFFERING DEMODULATION REFERENCE SIGNAL DENSITIES, WHEREIN RESPECTIVE DEMODULATION REFERENCE SIGNAL DENSITIES OF THE FIRST GROUP OF DIFFERING DEMODULATION REFERENCE SIGNAL DENSITIES CORRESPOND TO RESPECTIVE ANTENNA PORTS OF THE GROUP OF ANTENNA PORTS, AND WHEREIN COMMUNICATING THE FIRST BROADBAND CELLULAR COMMUNICATIONS FOR UPLINK COMMUNICATIONS ACCORDING TO THE FIRST GROUP OF DIFFERING DEMODULATION REFERENCE SIGNAL DENSITIES IS PERFORMED INDEPENDENTLY OF A SECOND GROUP OF DEMODULATION REFERENCE SIGNAL DENSITIES THAT IS CONFIGURED FOR DOWNLINK COMMUNICATIONS 1004

USING THE FIRST GROUP OF DIFFERING DEMODULATION REFERENCE SIGNAL DENSITIES TO FURTHER COMMUNICATE THE BROADBAND CELLULAR COMMUNICATIONS WITH THE BASE STATION 1006

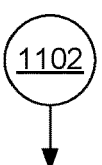

1102

FACILITATING, BY A SYSTEM COMPRISING A PROCESSOR, BROADBAND CELLULAR COMMUNICATIONS WITH A BASE STATION 1104

FACILITATING, BY THE SYSTEM, RECEIVING A COMMUNICATION FROM THE BASE STATION INDICATIVE OF COMMUNICATING AN UPLINK PORTION OF THE BROADBAND CELLULAR COMMUNICATIONS ACCORDING TO A FIRST GROUP OF DIFFERING DEMODULATION REFERENCE SIGNAL DENSITIES, WHEREIN COMMUNICATING A DOWNLINK PORTION OF THE BROADBAND CELLULAR COMMUNICATIONS IS PERFORMED ACCORDING TO A SECOND GROUP OF DEMODULATION REFERENCE SIGNAL DENSITIES DIFFERENT FROM THE FIRST GROUP OF DIFFERING DEMODULATION REFERENCE SIGNAL DENSITIES 1106

AFTER RECEIVING THE COMMUNICATION INDICATIVE OF COMMUNICATING THE UPLINK PORTION OF THE BROADBAND CELLULAR COMMUNICATIONS ACCORDING TO THE FIRST GROUP OF DIFFERING DEMODULATION REFERENCE SIGNAL DENSITIES, FACILITATING, BY THE SYSTEM, THE BROADBAND CELLULAR COMMUNICATIONS WITH THE BASE STATION FURTHER ACCORDING TO THE FIRST GROUP OF DIFFERING DEMODULATION REFERENCE SIGNAL DENSITIES 1108

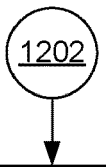

AS PART OF BROADBAND CELLULAR COMMUNICATIONS WITH A BASE STATION, RECEIVING A COMMUNICATION INDICATIVE OF USING A GROUP OF DIFFERING DEMODULATION REFERENCE SIGNAL DENSITIES FOR UPLINK COMMUNICATIONS OF THE BROADBAND CELLULAR COMMUNICATIONS 1204

AFTER RECEIVING THE COMMUNICATION INDICATIVE OF USING THE GROUP OF DIFFERING DEMODULATION REFERENCE SIGNAL DENSITIES FROM THE BASE STATION, CONDUCTING THE UPLINK COMMUNICATIONS WITH THE BASE STATION ACCORDING TO THE GROUP OF DIFFERING DEMODULATION REFERENCE SIGNAL DENSITIES 1206

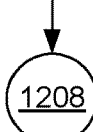

FIG. 12

UNEQUAL DENSITY DEMODULATION REFERENCE SIGNAL POSITIONS

RELATED APPLICATIONS

The subject patent application is related by subject matter to, U.S. patent application Ser. No. 18/488,818, filed Oct. 17, 2023 and entitled "UNEQUAL DENSITY DEMODULATION REFERENCE SIGNAL POSITIONS," the entirety of which application is hereby incorporated by reference herein.

The subject patent application is related by subject matter to, U.S. patent application Ser. No. 18/488,829, filed Oct. 17, 2023 and entitled "UNEQUAL DENSITY DEMODULATION REFERENCE SIGNAL POSITIONS," the entirety of which application is hereby incorporated by reference herein.

BACKGROUND

In cellular broadband communications, a user equipment and a network can communicate to configure a protocol to use in making further communications.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a message from a base station configured to communicate via a group of antenna ports, the message being indicative of conducting uplink communications of broadband cellular communications with the base station according to a first group of differing demodulation reference signal densities, wherein respective demodulation reference signal densities of the first group of differing demodulation reference signal densities correspond to respective antenna ports of the group of antenna ports, and wherein communicating the broadband cellular communications for uplink communications according to the first group of differing demodulation reference signal densities is performed independently of a second group of demodulation reference signal densities that is configured for downlink communications. The system can use the first group of differing demodulation reference signal densities to further communicate the broadband cellular communications with the base station.

An example method can comprise facilitating, by a system comprising a processor, broadband cellular communications with a base station. The method can further comprise facilitating, by the system, receiving a communication from the base station indicative of communicating an uplink portion of the broadband cellular communications according to a first group of differing demodulation reference signal densities, wherein communicating a downlink portion of the broadband cellular communications is performed according to a second group of demodulation reference signal densities different from the first group of differing demodulation reference signal densities. The method can further comprise, after receiving the communication indicative of communicating the uplink portion of the broadband cellular communications according to the first group of differing demodulation reference signal densities, facilitating, by the system, the broadband cellular communications with the base station further according to the first group of differing demodulation reference signal densities.

An example non-transitory computer-readable medium can comprise instructions that, in response to execution, cause a system comprising a processor to perform operations. These operations can comprise, as part of broadband cellular communications with a base station, receiving a communication indicative of using a group of differing demodulation reference signal densities for uplink communications of the broadband cellular communications. These operations can further comprise, after receiving the communication indicative of using the group of differing demodulation reference signal densities from the base station, conducting the uplink communications with the base station according to the group of differing demodulation reference signal densities.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example system architecture that can facilitate unequal density demodulation reference signal (DM-RS; sometimes referred to as DMRS) positions, in accordance with an embodiment of this disclosure;

FIG. 4 illustrates an example signal flow that can facilitate unequal density DM-RS positions, in accordance with an embodiment of this disclosure;

FIG. 10 illustrates an example process flow that can facilitate unequal density DM-RS positions, in accordance with an embodiment of this disclosure;

FIG. 11 illustrates another example process flow that can facilitate unequal density DM-RS positions, in accordance with an embodiment of this disclosure;

FIG. 12 illustrates another example process flow that can facilitate unequal density DM-RS positions, in accordance with an embodiment of this disclosure;

DETAILED DESCRIPTION

Overview

Figure 2:
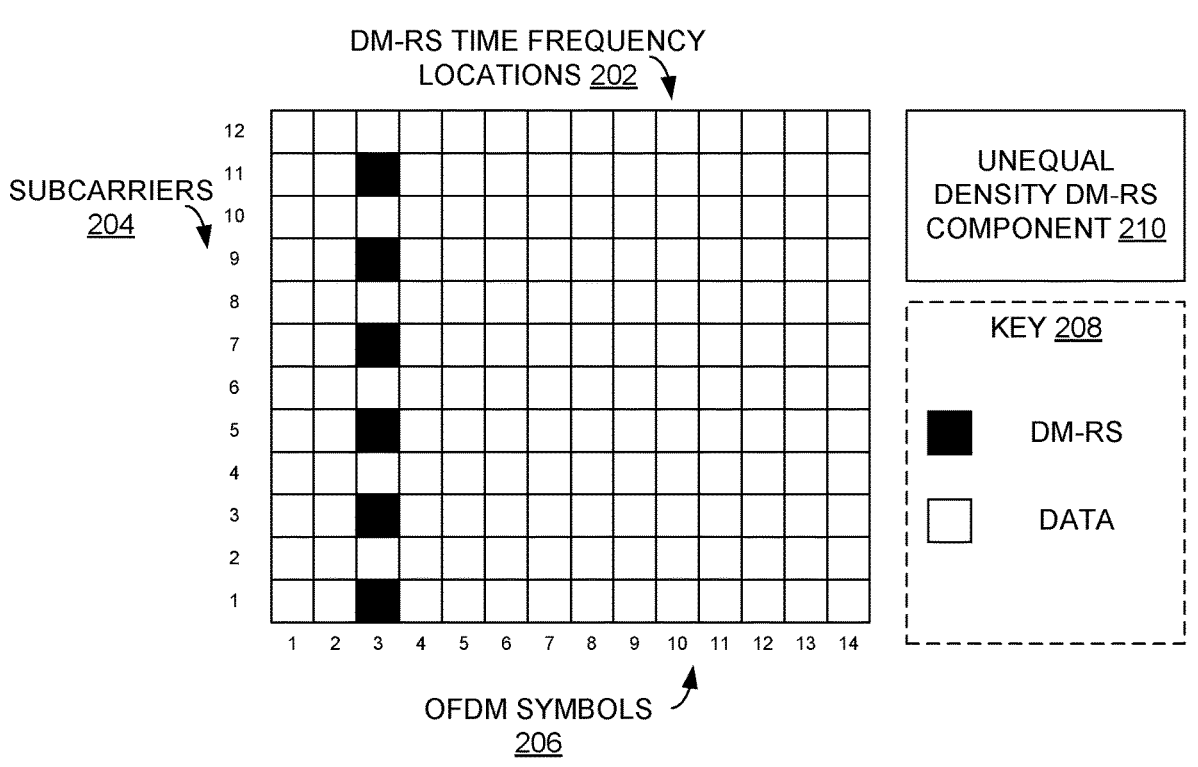
FIG. 2 illustrates an example DM-RS configuration of equal density DM-RS positions, which can be implemented by a component that facilitates unequal density DM-RS positions, in accordance with an embodiment of this disclosure.

The present techniques can generally be implemented to facilitate unequal-density DM-RS positions for user equipment (UE) in conducting physical uplink shared channel (PUSCH) communications with a base station (e.g., a gNodeB (gNB)). It can be appreciated that, in some examples, similar techniques can be applied to facilitate unequal-density DM-RS positions for a UE in conducting physical downlink shared channel (PDSCH) communications with a gNB, and unequal-density DM-RS positions for a gNB in conducting PUSCH and/or PDSCH communications with a UE.

In coherent radio communications, channel knowledge can be needed at a receiver in order to detect transmitted modulated symbols. Channel knowledge at a receiver can be realized by transmitting pilot symbols along with data symbols. The pilot symbols can be known to the receiver. The receiver can estimate the channel using the received pilot symbols, which have gone through the channel. Channel estimation can be an important component in an advanced communication system; and its performance can have significant impact on the overall communication system performance.

In 3rd Generation Partnership Project (3GPP) mobile telecommunications terminology, pilot symbols designed for the purpose of symbol demodulation at the receiver can be called DM-RS. In orthogonal frequency-division multiplexing (OFDM), DM-RS can be assigned to resource elements (RE) within a physical resource block (PRB) according to specific patterns specified in fifth generation new radio (5G NR) standards. In some examples, such as some 3GPP implementations, the frequency domain (sometimes referred to as a frequency dimension) can be divided into parts that can be referred to as subcarriers.

Prior approaches to 5G NR specifications can provide a same density for all DM-RS ports irrespective of a channel experienced by different layers/UEs. Some UEs can experience a line of sight (LOS) channel while others can experience a non-line of sight (NLOS) channel in a MU-MIMO setup. A LOS channel can be estimated with sufficient accuracy with low density DM-RS across subcarriers while a NLOS channel can require higher density DM-RS. Similarly, some UEs can experience higher mobility than others and can require larger DM-RS density across time compared to stationary UEs.

It can be that prior approaches to 5G NR do not provide a flexibility to choose unequal density DM-RS either across time or frequency (subcarriers). The present techniques can be implemented to facilitate flexibility to support unequal density DM-RS ports either across frequency or time or both.

In some examples, the present techniques can be implemented to facilitate unequal density DM-RS across frequency (subcarriers). In some examples, the present techniques can be implemented to facilitate unequal density DM-RS across time (OFDM symbols).

Example Architecture

FIG. 1 illustrates an example system architecture 100 that can facilitate unequal density DM-RS positions in accordance with an embodiment of this disclosure. In some examples, part(s) of system architecture can be used to implement the DM-RS configurations of FIGS. 2-3 and/or 5-9, the signal flows of FIG. 4, and/or the process flows of FIGS. 10-12.

In cellular communications, there can be a master cell group (MCG) to which a UE initially registers. A cell that is used to initiate initial access can be referred to as a primary cell (Pcell). A Pcell can be combined with one or more secondary cells (Scells) under an MCG using carrier aggregation techniques, which can generally involve combining multiple carriers to increase bandwidth available to UEs.

The examples herein generally relate to 5G cellular communications networks, where Pcells and Scells are used. It can be appreciated that the present techniques can be applied to other types of cellular communications networks for unequal density DM-RS positions.

As depicted, system architecture 100 comprises gNB 102, Pcell 104, Scell(s) 106, UE 108, unequal density DM-RS component 110A, and unequal density DM-RS component 110B.

gNB 102 can generally comprise a cellular fifth-generation (5G) base station, can comprise multiple antennas, and can concurrently communicate with multiple instances of UE 108. UE 108 can generally comprise a computing device that is configured to be used directly by an end-user to communicate with gNB 102. Pcell 104 can be a Pcell as described herein, and that is communicatively coupled to both gNB 102 and UE 108. Similarly, Scell(s) 106 can be one or more Scells as described herein, and that are communicatively coupled to both gNB 102 and UE 108.

Unequal density DM-RS component 110A can generally comprise a component of gNB 102 that facilitates unequal density DM-RS positions as described herein. Similarly, unequal density DM-RS component 110B can generally comprise a component of UE 108 that facilitates unequal density DM-RS positions as described herein.

Example Configurations and Signal Flow

FIG. 2 illustrates an example DM-RS configuration 200 of equal density DM-RS positions, which can be implemented by a component that facilitates unequal density DM-RS positions, in accordance with an embodiment of this disclosure. In some examples, part(s) of DM-RS configuration 200 can be used by part(s) of system architecture 100 of FIG. 1 to facilitate either equal density DM-RS positions or unequal density DM-RS positions.

DM-RS configuration 200 comprises DM-RS time frequency locations 202 (which in turn comprises subcarriers 204 and OFDM symbols 206); key 208 (which can indicate the contents of various parts of DM-RS time frequency locations 202); and unequal density DM-RS component 210 (which can be similar to unequal density DM-RS component 110A and/or unequal density DM-RS component 110B of FIG. 1).

Figure 3:
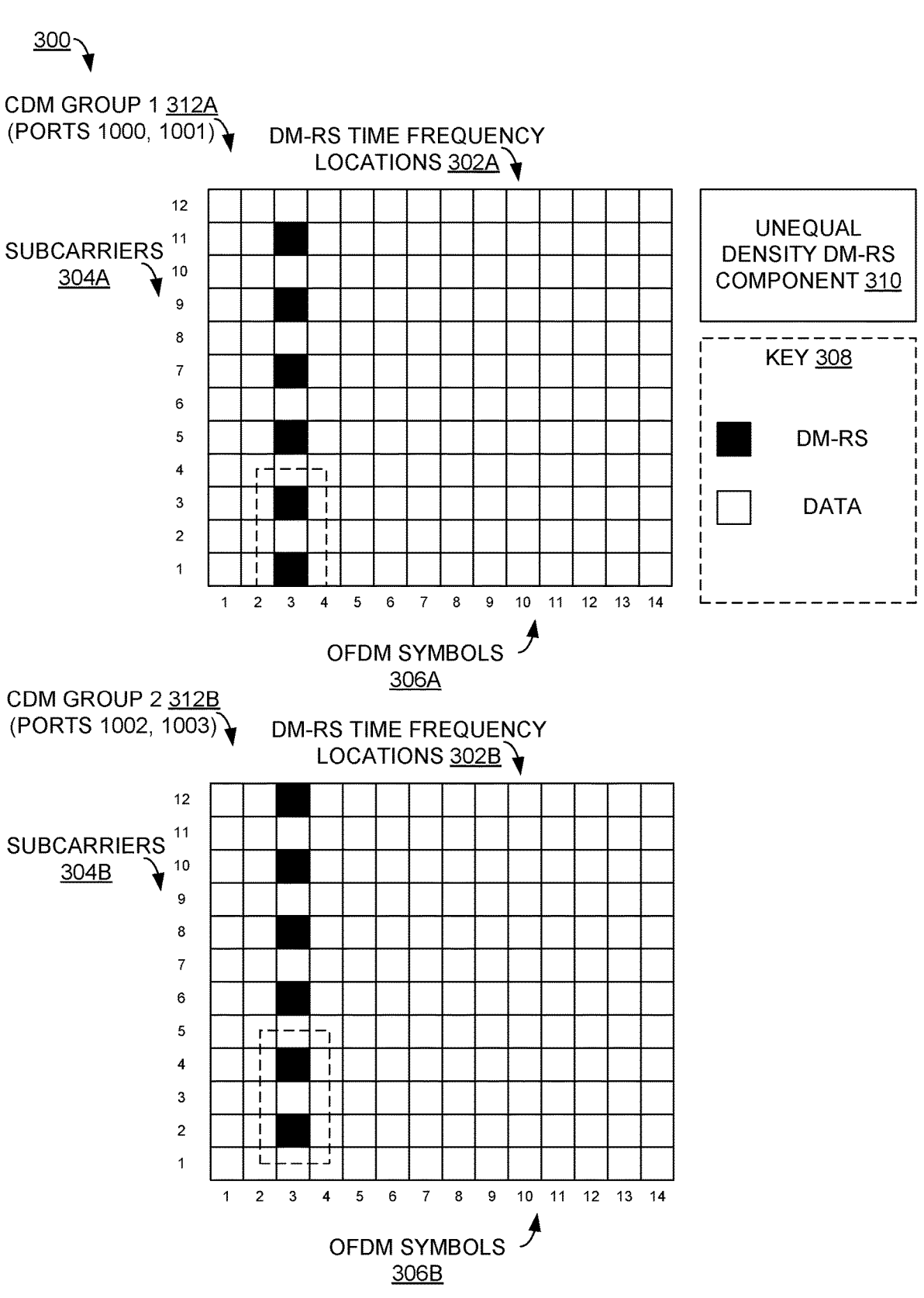
FIG. 3 illustrates another example DM-RS configuration of equal density DM-RS positions, which can be implemented by a component that facilitates unequal density DM-RS positions, in accordance with an embodiment of this disclosure.

DM-RS time frequency locations 202 and DM-RS time frequency locations 302 of FIG. 3 generally comprise equal density DM-RS positions. It can be appreciated that the present techniques can be implemented such that unequal density DM-RS component 110A and/or unequal density DM-RS component 110B of FIG. 1 can facilitate communications with both equal and unequal density DM-RS positions, and that FIGS. 2-3 illustrate examples where unequal density DM-RS component 110A and/or unequal density DM-RS component 110B can facilitate communications with equal density DM-RS positions.

The example DM-RS configuration of FIG. 2 is shown in a PRB grid. DM-RS symbols can be spread across subcarriers and OFDM symbols according to different periodicities in order to provide acceptable channel estimation accuracy depending on wireless channel frequency/time selectivity. A dense DM-RS pattern can result in more accurate channel estimation performance at a price of occupying more resources within PRBs that could be used for data transmission otherwise.

In multiple-input multiple-output (MIMO) transmission where multiple layers are transmitted, the channel corresponding to each layer can be estimated. For that purpose, multiple DM-RS can be transmitted corresponding to different transmit antenna ports. In some examples, NR can support up to 8 DM-RS ports for single user MIMO (SU-MIMO) and up to 12 DM-RS ports for multi-user MIMO (MU-MIMO). The DM-RS corresponding to different antenna ports can be separated (non-interfering) either in time, frequency, or code domain.

DM-RS configuration can be performed by a network through higher layer configuration such as radio resource control (RRC) or through downlink control information (DCI). Some configuration parameters/information elements that can impact DM-RS in PUSCH are as follows:

Parameters That Control Time Domain Resources
    pusch.SymbolAllocation
    pusch.MappingType
    dmrs.DMRSTypeAPosition
    dmrs.DMRSLength
    dmrs.DMRSAdditionalPosition Parameters That Control Frequency Domain Resources
    dmrs.DMRSConfigurationType
    pusch.NumLayers Parameter that Controls the REs not Available for Data Transmission
    dmrs.NumCDMGroupsWithoutData Parameters that Control the DM-RS Sequence Generation
    dmrs.NIDNSCID
    dmrs.NSCID Similar parameters can be used for configuration of PDSCH, physical downlink control channel (PDDCH), physical uplink control channel (PUCCH), etc.

FIG. 3 illustrates another example DM-RS configuration 300 of equal density DM-RS positions, which can be implemented by a component that facilitates unequal density DM-RS positions, in accordance with an embodiment of this disclosure. In some examples, part(s) of DM-RS configuration 300 can be used by part(s) of system architecture 100 of FIG. 1 to facilitate either equal density DM-RS positions or unequal density DM-RS positions.

DM-RS configuration 300 comprises CDM group 1 312A, CDM group 2 312B, key 308 (which can be similar to key 208 of FIG. 2); and unequal density DM-RS component 310 (which can be similar to unequal density DM-RS component 110A and/or unequal density DM-RS component 110B of FIG. 1).

CDM group 1 312A can correspond to ports 1000 and 1001, and can comprise DM-RS time frequency locations 302A, subcarriers 304A, and OFDM symbols 306A. CDM group 2 312B can correspond to ports 1002 and 1003, and can comprise DM-RS time frequency locations 302B, subcarriers 304B, and OFDM symbols 306B.

An example DM-RS configuration with select parameters is shown as follows:
    pusch.NumLayers=4;
    pusch.MappingType='A';
    pusch.SymbolAllocation=[0 13]; % [startSymbol Length]
    dmrs.DMRSConfigurationType=1;
    dmrs.DMRSLength=1;
    dmrs.DMRSAdditionalPosition=0;
    dmrs.DMRSTypeAPosition=2;
    dmrs.NumCDMGroupsWithoutData=1;
    dmrs.NIDNSCID=10;
    dmrs.NSCID=0;

A corresponding example RE allocation is shown in FIG. 3. As can be seen, in this example, all four ports, 1000-1003, have the same density across subcarriers. In general, in 5G NR, the DM-RS density can be the same for all DM-RS antenna ports (layers). In other words, it can be that there is no flexibility in the choice of DM-RS density for different layers. In MU-MIMO transmission, where different layers correspond to different user equipment (UEs), each experiencing a potentially different propagation environment, flexibility to choose different DM-RS density can be important in order to achieve a better resource utilization/channel estimation accuracy trade off by allocating different densities according to their channel conditions. The present techniques can be implemented to facilitate flexible DM-RS design such that different DM-RS antenna ports can have different DM-RS densities.

FIG. 4 illustrates an example signal flow that can facilitate unequal density DM-RS positions, in accordance with an embodiment of this disclosure. In some examples, part(s) of signal flow 400 can be used by part(s) of system architecture 100 of FIG. 1 to facilitate unequal density DM-RS positions.

Signal flow 400 comprises gNB 404, UE 406, DM-RS configuration 408, DM-RS mapping 410, uplink transmission 412, and channel estimation 414.

The present techniques can be based on introducing new parameter(s) for DM-RS configuration and to define how the new parameter(s) are interpreted by the network (such as a gNB) and UE for DM-RS to RE mapping for antenna ports. FIG. 4 illustrates flow diagrams for DM-RS configuration in uplink and downlink transmission.

gNB 404 can configure UE 406 with DM-RS related parameters (including new parameters for unequal density DM-RS) for uplink transmission, as part of sending UE 406 DM-RS configuration 408.

UE 406 can, in response to receiving DM-RS configuration 408, map DM-RS to PRBs for each antenna report.

UE 406 transmits data and DM-RS to gNB 404 in uplink transmission 412. Upon receiving uplink transmission 412, gNB 404 can find a location of the DM-RS within the received PRBs according to the configured DM-RS in DM-RS configuration 408, and can perform channel estimation 414 using the received DM-RS symbols in uplink transmission 412.

A mapping of DM-RS to PRBs can comprise placing DM-RS symbols in a PRB grid according to a DM-RS configuration. Data can also be placed in PRB grid locations that are not occupied by DM-RS or other reference signals.

Channel estimation can be performed on received DM-RS symbols. Channel estimation can comprise locating DM-RS symbols within received PRBs. Locating DM-RS symbols within a received PRB can be performed according to a (unequal density) configuration in DM-RS configuration 408.

A DM-RS configuration according to the present techniques can include the following parameter to allow unequal density DM-RS in frequency across antenna ports:

dmrs.CDMgroupFrequencyDensity

This parameter can be set by a vector of integer values of size equal to the number of code division multiplexing (CDM) groups. It can be that there is no explicit parameter defined in NR for the number of CDM groups in DM-RS configuration. The number of CDM groups can be determined based on pusch.NumLayers and dmrs.DMRSConfigurationType. For a Type 1 configuration, the number of CDM groups can be either 1 or 2. For a Type 2 configuration, the number of CDM groups can be either 1, 2, or 3. The integer values in the vector can be an indicator of the density for each CDM group.

As an example, in the following configuration, there are two CDM groups where CDM groups 1 and 2 are repeated 2 and 4 times, respectively, in a PRB.

. . .

pusch.NumLayers=4
dmrs.DMRSConfigurationType=1
dmrs.CDMGroupFrequencyDensity=[2 4]

. . .

In the sequel, it can be shown how the DM-RS configuration is interpreted by gNB/UE in the presence of new parameter, dmrs.CDMGroupFrequencyDensity. Rules can be provided for DM-RS RE mapping when the above information element (IE) is present in the configuration.

A configuration for unequal DM-RS density according to the present techniques can be backward compatible with 5G NR. That is, it can be backward compatible in the sense that if the new parameter is non-existent or all its values are equal, it can be that there will be no change in the DM-RS configuration compared to NR.

In an NR Type 1 configuration, each CDM group can be repeated 3 times in a PRB as seen in FIG. 2. A DM-RS to RE mapping according to the present techniques can follow NR mapping followed by adjustments according to a parameter dmrs.CDMGroupFrequencyDensity. If an integer value in the vector is 3, the corresponding CDM group can have the same density as in NR mapping. If an integer value is less than 3, the corresponding CDM group density can be reduced accordingly. Finally, if an integer value is more than 3, the corresponding CDM group density can be increased accordingly.

In a NR Type 2 configuration, each CDM group can be repeated twice in a PRB. Similarly, CDM group densities can be adjusted if the corresponding integer is not 2.

Another aspect of the present techniques can be an added flexibility to allow different DM-RS port densities across time. For this, the following IE can be used: dmrs.DMRSAdditionalPosition However, instead of the above IE taking values in the range 0-3 (like in some prior approaches), it can take a vector of size: number of CDM groups. The values in the vector can take values in the same range 0-3. Like the previous aspect, this aspect can be backward compatible: If the IE takes a single value or a vector of same-valued integers, the IE can be interpreted as in a NR approach. Otherwise, the integers within the vector can determine the additional DM-RS positions for the corresponding CDM groups.

The present techniques can be implemented to determine appropriate DM-RS densities in time or frequency for different DM-RS antenna ports/CDM groups according to UE channel state information (CSI), or other UE-related information (UE position, UE speed, etc.) available at a network (e.g., a gNB) obtained through sensing or any other approach. CSI can be available at a gNB either through UE feedback or uplink-downlink channel reciprocity in time division duplex (TDD) mode.

A gNB can use collected UE CSI samples in order to analyze UE channel rank/sparsity or line of sight (LOS)/non line of sight (NLOS) classification which can be used for the determination of DM-RS density across frequency. On the other hand, gNB can use UE speed as a factor to determine DM-RS density across time. The higher UE speed/UE doppler spread, it can be that more DM-RS is required for sufficient channel estimation accuracy. Use of artificial intelligence/machine learning (AI/ML) approaches on current or historical network data can be performed in a determination of appropriate DM-RS densities for antenna ports.

The following examples illustrate DM-RS mapping given a parameter according to the present techniques.

Figure 5:
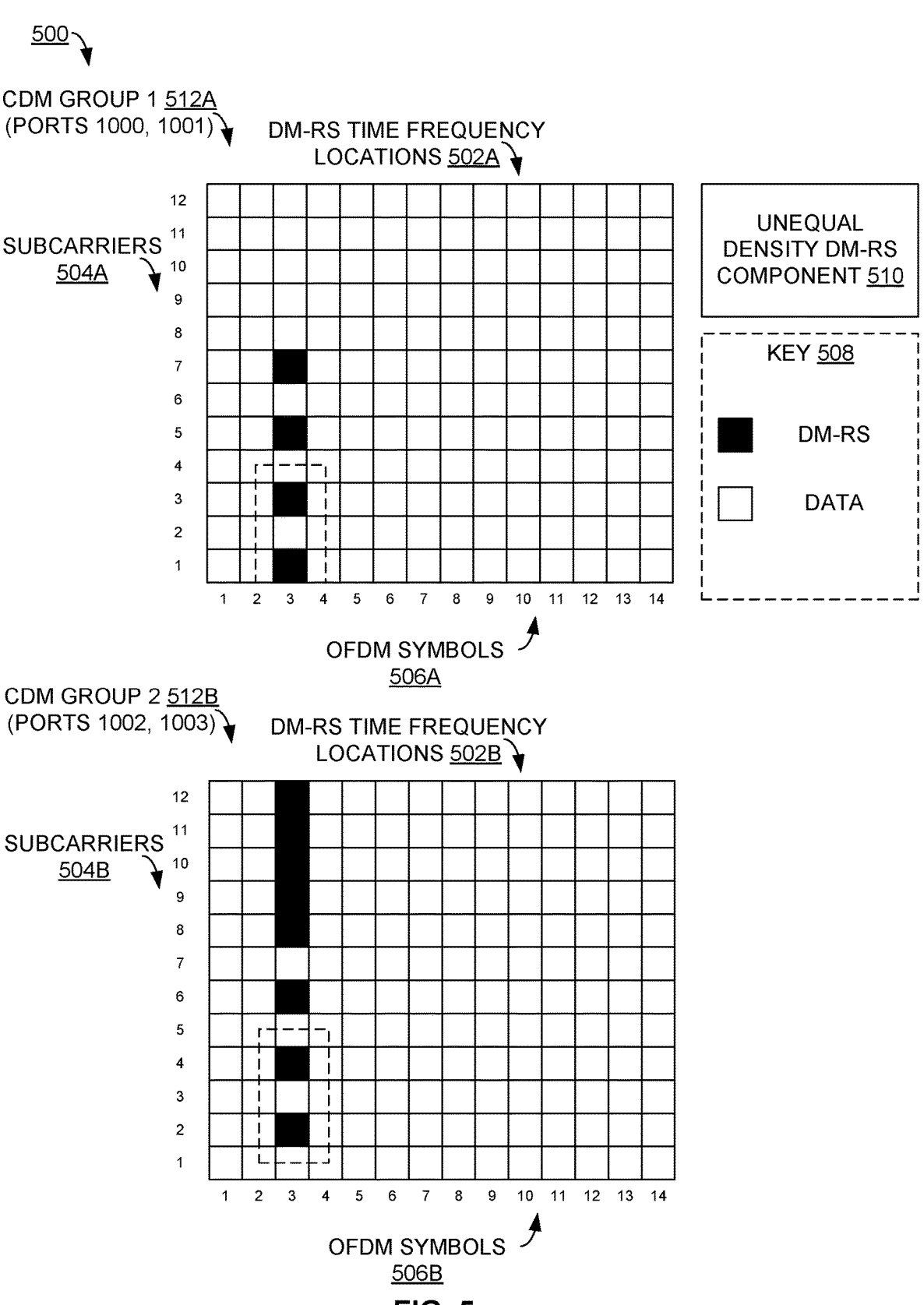
FIG. 5 illustrates another example DM-RS configuration that can facilitate unequal density DM-RS positions, in accordance with an embodiment of this disclosure.

FIG. 5 illustrates another example DM-RS configuration 500 that can facilitate unequal density DM-RS positions, in accordance with an embodiment of this disclosure. In some examples, part(s) of DM-RS configuration 500 can be used by part(s) of system architecture 100 of FIG. 1 to facilitate unequal density DM-RS positions.

DM-RS configuration 500 comprises CDM group 1 512A, CDM group 2 512B, key 508 (which can be similar to key 208 of FIG. 2); and unequal density DM-RS component 510 (which can be similar to unequal density DM-RS component 110A and/or unequal density DM-RS component 110B of FIG. 1).

CDM group 1 512A can correspond to ports 1000 and 1001, and can comprise DM-RS time frequency locations 502A, subcarriers 504A, and OFDM symbols 506A. CDM group 2 512B can correspond to ports 1002 and 1003, and can comprise DM-RS time frequency locations 502B, subcarriers 504B, and OFDM symbols 506B.

Consider the following Type 1 configuration:
pusch.NumLayers=4;
pusch.MappingType='A';
pusch.SymbolAllocation=[0 13]; % [startSymbol Length]
dmrs.DMRSConfigurationType=1;
dmrs.DMRSLength=1;
dmrs.DMRSAdditionalPosition=0;
dmrs.DMRSTypeAPosition=2;
dmrs.NumCDMGroupsWithoutData=2;
dmrs.NIDNSCID=10;
dmrs.NSCID=0;
dmrs.CDMGroupFrequencyDensity=[2 4]

Without the new parameter, the DM-RS mapping could be as shown in FIG. 3. Given the integer values within the new information element, CDM group 1 has density 2 while CDM group 2 has density 4. The corresponding DM-RS mapping is shown in FIG. 5.

Figure 6:
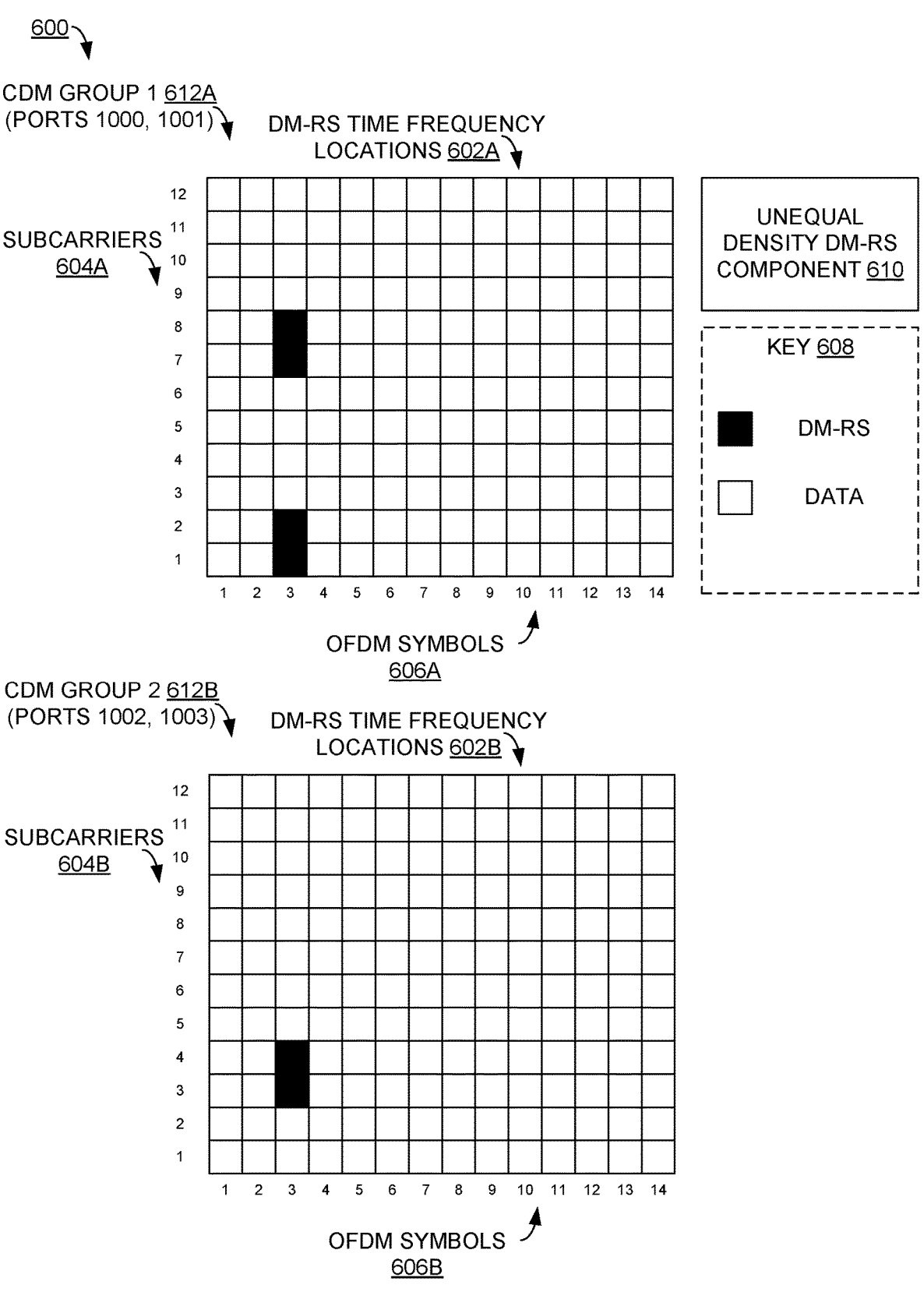
FIG. 6 illustrates another example DM-RS configuration that can facilitate unequal density DM-RS positions, in accordance with an embodiment of this disclosure.

FIG. 6 illustrates another example DM-RS configuration 600 that can facilitate unequal density DM-RS positions, in accordance with an embodiment of this disclosure. In some examples, part(s) of DM-RS configuration 600 can be used by part(s) of system architecture 100 of FIG. 1 to facilitate unequal density DM-RS positions.

DM-RS configuration 600 comprises CDM group 1 612A, CDM group 2 612B, key 608 (which can be similar to key 208 of FIG. 2); and unequal density DM-RS component 610 (which can be similar to unequal density DM-RS component 110A and/or unequal density DM-RS component 110B of FIG. 1).

CDM group 1 612A can correspond to ports 1000 and 1001, and can comprise DM-RS time frequency locations 602A, subcarriers 604A, and OFDM symbols 606A. CDM group 2 612B can correspond to ports 1002 and 1003, and can comprise DM-RS time frequency locations 602B, sub-carriers 604B, and OFDM symbols 606B.

Consider the following Type 2 configuration:
pusch.NumLayers=4;
pusch.MappingType='A';
pusch.SymbolAllocation=[0 13]; % [startSymbol Length]
dmrs.DMRSConfigurationType=2;
dmrs.DMRSLength=1;
dmrs.DMRSAdditionalPosition=0;
dmrs.DMRSTypeAPosition=2;
dmrs. NumCDMGroupsWithoutData=2;
dmrs.NIDNSCID=10;
dmrs.NSCID=0;
dmrs.CDMGroupFrequencyDensity=[2 1]

Given that pusch.NumLayers=4, there are two CDM groups. According to dmrs.CDMGroupFrequencyDensity=[2 1], the first CDM group has a default density as in NR. However, the second CDM group has density 1. The resulting DM-RS mapping is shown in FIG. 6.

Figure 7A:
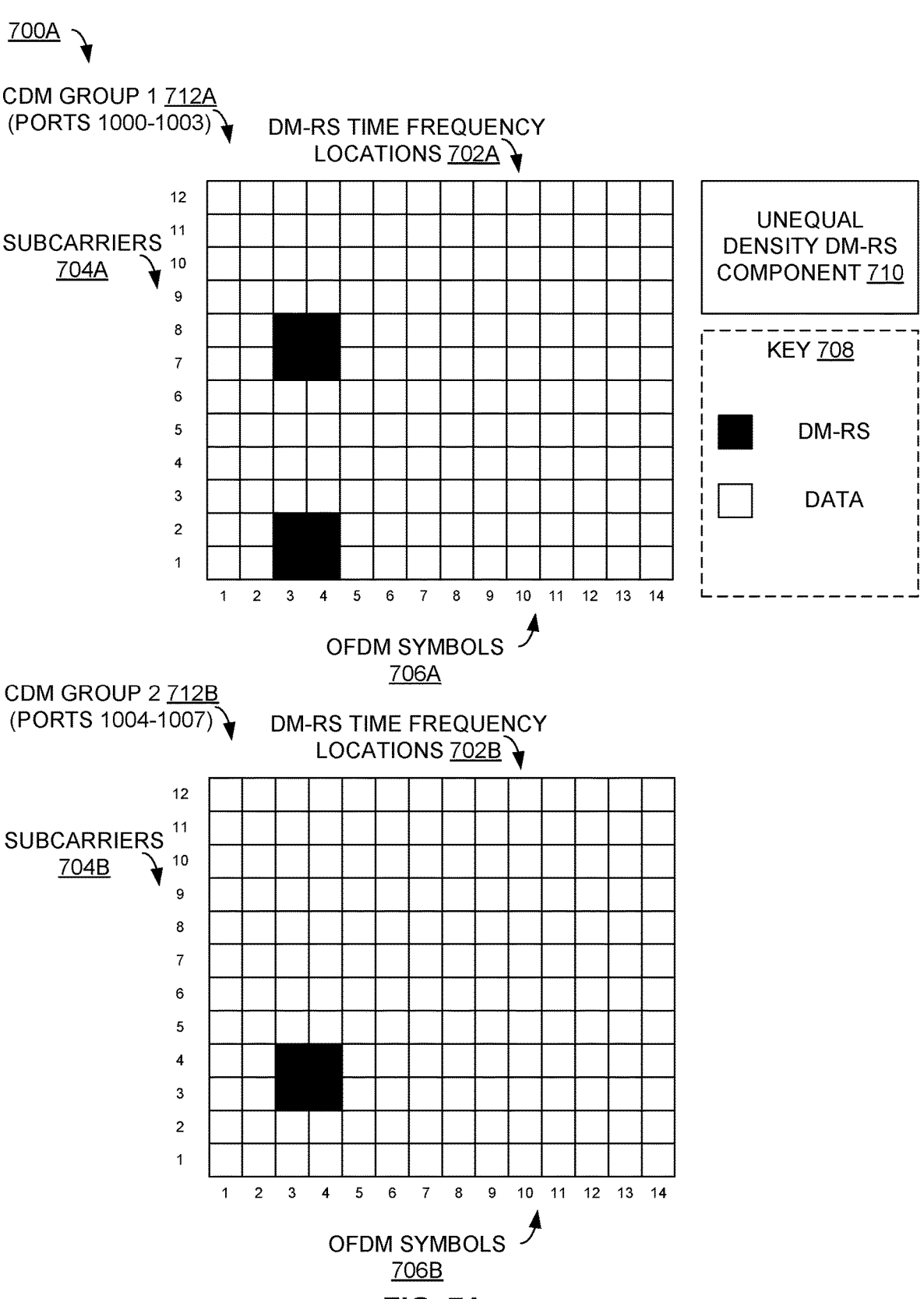
FIGS. 7A and 7B illustrate another example DM-RS configuration that can facilitate unequal density DM-RS positions, in accordance with an embodiment of this disclosure.
Figure 7B:
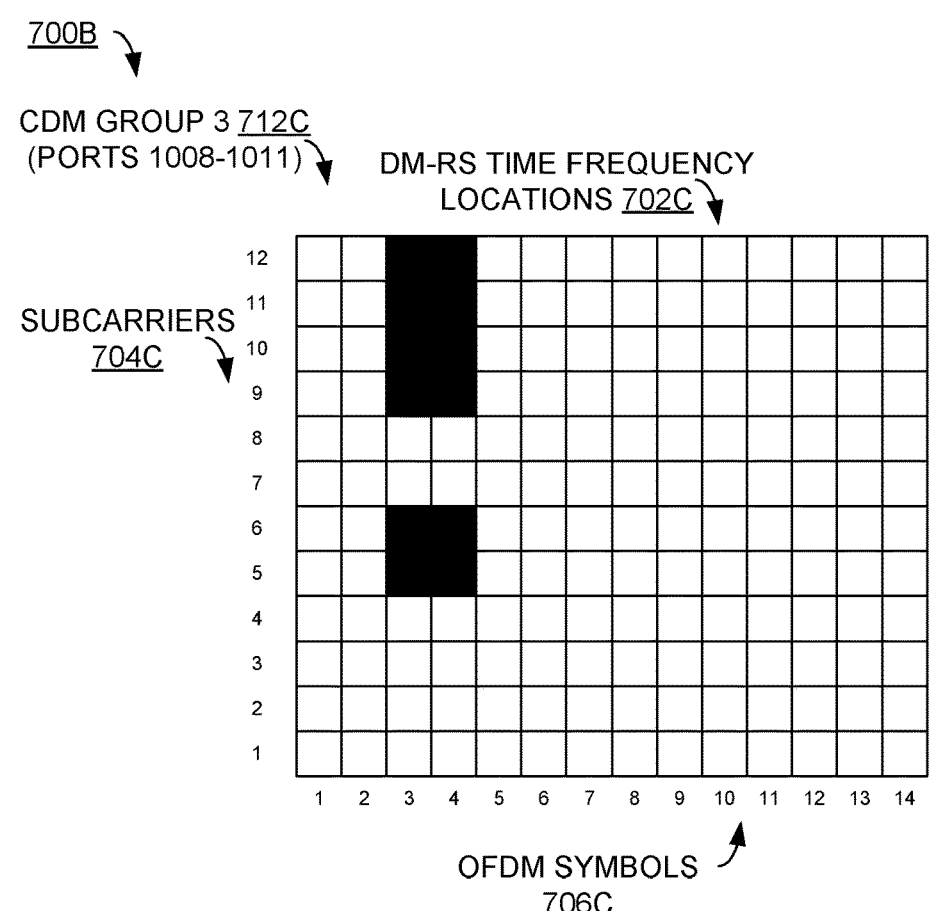

FIGS. 7A and 7B illustrate another example DM-RS configuration 700A and 700B that can facilitate unequal density DM-RS positions, in accordance with an embodiment of this disclosure. In some examples, part(s) of DM-RS configuration 700A and 700B can be used by part(s) of system architecture 100 of FIG. 1 to facilitate unequal density DM-RS positions.

DM-RS configuration 700A and 700B comprises CDM group 1 712A, CDM group 2 712B, CDM group 3 712C, key 708 (which can be similar to key 208 of FIG. 2); and unequal density DM-RS component 710 (which can be similar to unequal density DM-RS component 110A and/or unequal density DM-RS component 110B of FIG. 1).

CDM group 1 712A can correspond to ports 1000, 1001, 1002, and 1003, and can comprise DM-RS time frequency locations 702A, subcarriers 704A, and OFDM symbols 706A. CDM group 2 712B can correspond to ports 1004, 1005, 1006, and 1007, and can comprise DM-RS time frequency locations 702B, subcarriers 704B, and OFDM symbols 706B. CDM group 3 712C can correspond to ports 1008, 1009, 1010, and 1011, and can comprise DM-RS time frequency locations 702C, subcarriers 704C, and OFDM symbols 706C.

Consider the following double-symbol Type 2 configuration:
pusch.NumLayers=12;
pusch.MappingType='A';
pusch.SymbolAllocation=[0 13]; % [startSymbol Length]
dmrs.DMRSConfigurationType=2;
dmrs.DMRSLength=2;
dmrs.DMRSAdditionalPosition=0;
dmrs.DMRSTypeAPosition=2;
dmrs.NumCDMGroupsWithoutData=3;
dmrs.NIDNSCID=10;
dmrs.NSCID=0;
dmrs.CDMGroupFrequencyDensity=[2 1 3]

The corresponding DM-RS mapping is shown in FIG. 7.

Figure 8:
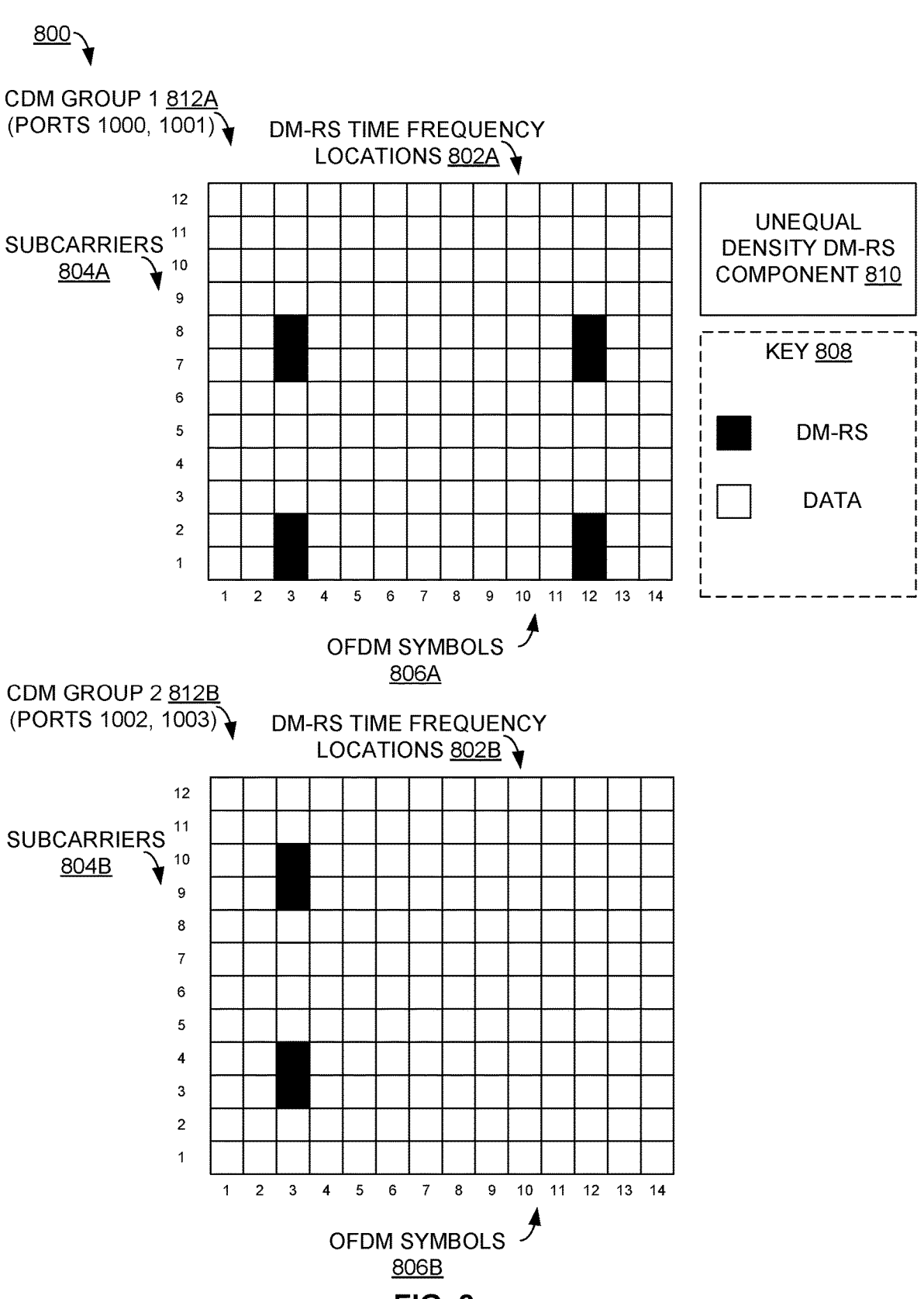
FIG. 8 illustrates another example DM-RS configuration that can facilitate unequal density DM-RS positions, in accordance with an embodiment of this disclosure.

FIG. 8 illustrates another example DM-RS configuration 800 that can facilitate unequal density DM-RS positions, in accordance with an embodiment of this disclosure. In some examples, part(s) of DM-RS configuration 800 can be used by part(s) of system architecture 100 of FIG. 1 to facilitate unequal density DM-RS positions.

DM-RS configuration 800 comprises CDM group 1 812A, CDM group 2 812B, key 808 (which can be similar to key 208 of FIG. 2); and unequal density DM-RS component 810 (which can be similar to unequal density DM-RS component 110A and/or unequal density DM-RS component 110B of FIG. 1).

CDM group 1 812A can correspond to ports 1000 and 1001, and can comprise DM-RS time frequency locations 802A, subcarriers 804A, and OFDM symbols 806A. CDM group 2 812B can correspond to ports 1002 and 1003, and can comprise DM-RS time frequency locations 802B, sub-carriers 804B, and OFDM symbols 806B.

This example can show how unequal density DM-RS across time can be realized. Consider the following Type 2 configuration with 4 layers shown below, which result in two CDM groups:
pusch.NumLayers=4;
pusch.MappingType='A';
pusch.SymbolAllocation=[0 13]; % [startSymbol Length]
dmrs.DMRSConfigurationType=2;
dmrs.DMRSLength=1;
dmrs.DMRSAdditionalPosition=[1 0];
dmrs.DMRSTypeAPosition=2;
dmrs.NumCDMGroupsWithoutData=2;
dmrs.NIDNSCID=10;
dmrs.NSCID=0;

Given that dmrs.DMRSAdditionalPosition=[1 0], there can be additional DM-RS for CDM group 0 at a 12th OFDM symbol (which can be per a NR specification). The corresponding DM-RS mapping is shown in FIG. 8.

Figure 9:
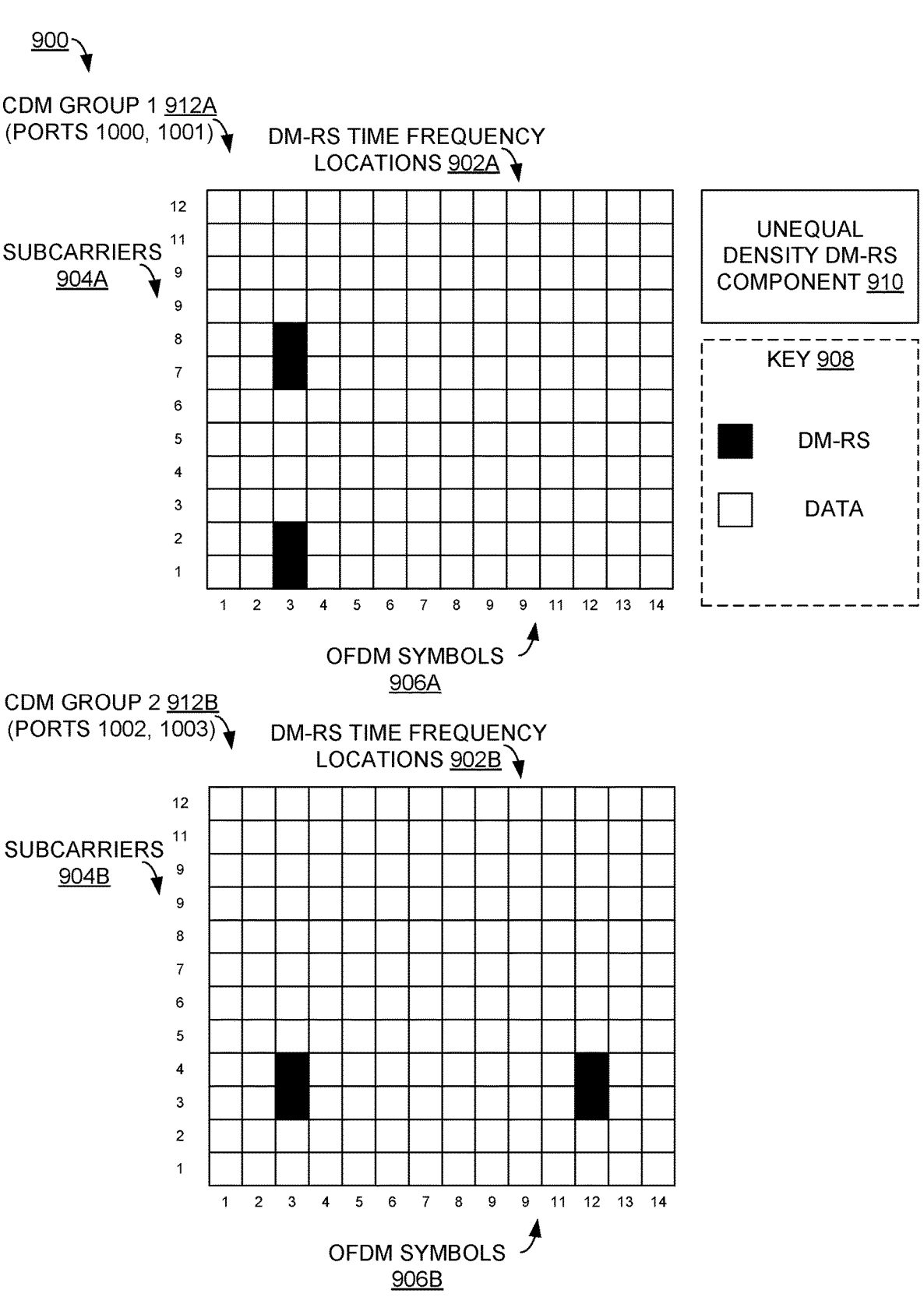
FIG. 9 illustrates another example DM-RS configuration that can facilitate unequal density DM-RS positions, in accordance with an embodiment of this disclosure.

FIG. 9 illustrates another example DM-RS configuration 900 that can facilitate unequal density DM-RS positions, in accordance with an embodiment of this disclosure. In some examples, part(s) of DM-RS configuration 900 can be used by part(s) of system architecture 100 of FIG. 1 to facilitate unequal density DM-RS positions.

DM-RS configuration 900 comprises CDM group 1 912A, CDM group 2 912B, key 908 (which can be similar to key 208 of FIG. 2); and unequal density DM-RS component 910 (which can be similar to unequal density DM-RS component 110A and/or unequal density DM-RS component 110B of FIG. 1).

CDM group 1 912A can correspond to ports 1000 and 1001, and can comprise DM-RS time frequency locations 902A, subcarriers 904A, and OFDM symbols 906A. CDM group 2 912B can correspond to ports 1002 and 1003, and can comprise DM-RS time frequency locations 902B, sub-carriers 904B, and OFDM symbols 906B.

According to the present techniques, unequal-density DM-RS can also be realized, both in frequency and time. An example configuration and the corresponding DM-RS mapping is provided below, and this corresponds to DM-RS configuration 900:
pusch.NumLayers=4;
pusch.MappingType='A';
pusch.SymbolAllocation=[0 13]; % [startSymbol Length]
dmrs.DMRSConfigurationType=2;
dmrs.DMRSLength=1;
dmrs.DMRSAdditionalPosition=[0 1];
dmrs.CDMGroupFrequencyDensity=[2 1]
dmrs.DMRSTypeAPosition=2;
dmrs.NumCDMGroupsWithoutData=2;
dmrs.NIDNSCID=10;
dmrs.NSCID=0;

Example Process Flows

FIG. 10 illustrates an example process flow 1000 that can facilitate unequal density DM-RS positions, in accordance with an embodiment of this disclosure. In some examples, one or more embodiments of process flow 1000 can be implemented by unequal density DM-RS component 110B of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

Process flow 1000 begins with 1002, and moves to operation 1004.

Operation 1004 depicts receiving a message from a base station configured to communicate via a group of antenna ports, the message being indicative of conducting uplink communications of broadband cellular communications with the base station according to a first group of differing demodulation reference signal densities, wherein respective demodulation reference signal densities of the first group of differing demodulation reference signal densities correspond to respective antenna ports of the group of antenna ports, and wherein communicating the broadband cellular communications for uplink communications according to the first group of differing demodulation reference signal densities is performed independently of a second group of demodulation reference signal densities that is configured for downlink communications.

Using the example of FIG. 1, unequal density DM-RS component 110B of UE 108 can perform operation 1004, and the base station can be gNB 102. gNB 102 can comprise multiple antenna ports. The uplink communications can be PUSCH communications, and differing DM-RS signal densities can be configured for PUSCH without changing a DM-RS configuration for PDSCH communications.

In some examples, the respective demodulation reference signal densities of the first group of differing demodulation reference signal densities differ across a frequency domain of the broadband cellular communications. That is, a configuration can be implemented to facilitate unequal density DM-RS in frequency across antenna ports.

In some examples, operation 1004 comprises receiving a parameter that identifies a vector, wherein respective values of the vector indicate the respective demodulation reference signal densities for respective code division multiplexing groups.

In some examples, a number of the code division multiplexing groups is indicated based on a combination of a number of layers parameter and a demodulation reference signal configuration type parameter that are communicated by the system.

In some examples, the respective demodulation reference signal densities of the first group of differing demodulation reference signal densities differ across a time domain of the broadband cellular communications. A time domain can sometimes be referred to as a time dimension. That is, there can be different DM-RS port densities across time.

In some examples, operation 1004 comprises receiving a parameter that identifies a vector, wherein respective values of the vector indicate the respective demodulation reference signal densities for respective code division multiplexing groups. In some examples, a size of the vector is equal to a number of code division multiplexing groups of the broadband cellular communications.

After operation 1004, process flow 1000 moves to operation 1006.

Operation 1006 depicts using the first group of differing demodulation reference signal densities to further communicate the broadband cellular communications with the base station.

Using the example of FIG. 4, this can comprise UE 406 sending uplink transmission 412.

In some examples, the communications comprise physical uplink shared channel communications. That is, the communications can comprise PUSCH communications.

In some examples, the uplink communications are transmitted via a first channel that carries user data, and independently of a second channel that carries control information. This second channel can comprise a physical uplink control channel (PUCCH), and/or can comprise higher-layer radio resource control (RRC) signaling and/or downlink control information (DCI).

After operation 1006, process flow 1000 moves to 1008, where process flow 1000 ends.

FIG. 11 illustrates an example process flow 1100 that can facilitate unequal density DM-RS positions, in accordance with an embodiment of this disclosure. In some examples, one or more embodiments of process flow 1100 can be implemented by unequal density DM-RS component 110B of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104.

Operation 1104 depicts facilitating broadband cellular communications with a base station. In some examples, operation 1104 can be implemented in a similar manner as operation 1004 of FIG. 10 as applied to conducting broadband cellular communications.

After operation 1104, process flow 1100 moves to operation 1106.

Operation 1106 depicts facilitating receiving a communication from the base station indicative of communicating an uplink portion of the broadband cellular communications according to a first group of differing demodulation reference signal densities, wherein communicating a downlink portion of the broadband cellular communications is performed according to a second group of demodulation reference signal densities different from the first group of differing demodulation reference signal densities. In some examples, operation 1106 can be implemented in a similar manner as operation 1004 of FIG. 10 as applied to the message indicative of conducting uplink communications.

In some examples, a demodulation reference signal density of the group of differing demodulation reference signal densities is based on channel state information that corresponds to the system. In some examples, the channel state information is based on user equipment feedback from the system. In some examples, the channel state information is based on an uplink-downlink channel reciprocity in a time-division duplex mode.

In some examples, a demodulation reference signal density of the group of differing demodulation reference signal densities is based on user equipment position information of the system.

In some examples, a demodulation reference signal density of the group of differing demodulation reference signal densities is based on user equipment speed information of the system.

After operation 1106, process flow 1100 moves to operation 1108.

Operation 1108 depicts, after receiving the communication indicative of communicating the uplink portion of the broadband cellular communications according to the first group of differing demodulation reference signal densities, facilitating the broadband cellular communications with the base station further according to the first group of differing demodulation reference signal densities. In some examples, operation 1108 can be implemented in a similar manner as operation 1006 of FIG. 10.

After operation 1108, process flow 1100 moves to 1110, where process flow 1100 ends.

FIG. 12 illustrates an example process flow 1200 that can facilitate unequal density DM-RS positions, in accordance with an embodiment of this disclosure. In some examples, one or more embodiments of process flow 1200 can be implemented by unequal density DM-RS component 110B of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10, and/or process flow 1100 of FIG. 11.

Process flow 1200 begins with 1202, and moves to operation 1204.

Operation 1204 depicts, as part of broadband cellular communications with a base station, receiving a communication indicative of using a group of differing demodulation reference signal densities for uplink communications of the broadband cellular communications. In some examples, operation 1204 can be implemented in a similar manner as operation 1004 of FIG. 10.

After operation 1204, process flow 1200 moves to operation 1206.

Operation 1206 depicts, after receiving the communication indicative of using the group of differing demodulation reference signal densities from the base station, conducting the uplink communications with the base station according to the group of differing demodulation reference signal densities. In some examples, operation 1206 can be implemented in a similar manner as operation 1006 of FIG. 10.

In some examples, the group of differing demodulation reference signal densities is a first group of differing demodulation reference signal densities, and operation 1206 comprises conducting downlink communications of the broadband cellular communications with the base station according to a second group of demodulation reference signal densities. In some examples, the first group of differing demodulation reference signal densities differs from the second group of demodulation reference signal densities. That is, differing demodulation reference signal densities can be implemented for PUSCH communications, and implemented separately from demodulation reference signal densities for PDSCH communications, which can be different (including both being differing demodulation reference signal densities).

In some examples, operation 1206 comprises mapping the group of differing demodulation reference signal densities for the uplink communications to a group of physical resource blocks, to produce a group of mapped physical resource blocks. This can be performed in a similar manner as described with respect to FIG. 4.

In some examples, conducting the uplink communications with the base station according to the group of differing demodulation reference signal densities comprises conducting the uplink communications with the base station according to the group of mapped physical resource blocks. This can be performed in a similar manner as described with respect to FIG. 4.

After operation 1206, process flow 1200 moves to 1208, where process flow 1200 ends.

Example Operating Environment

Figure 13:
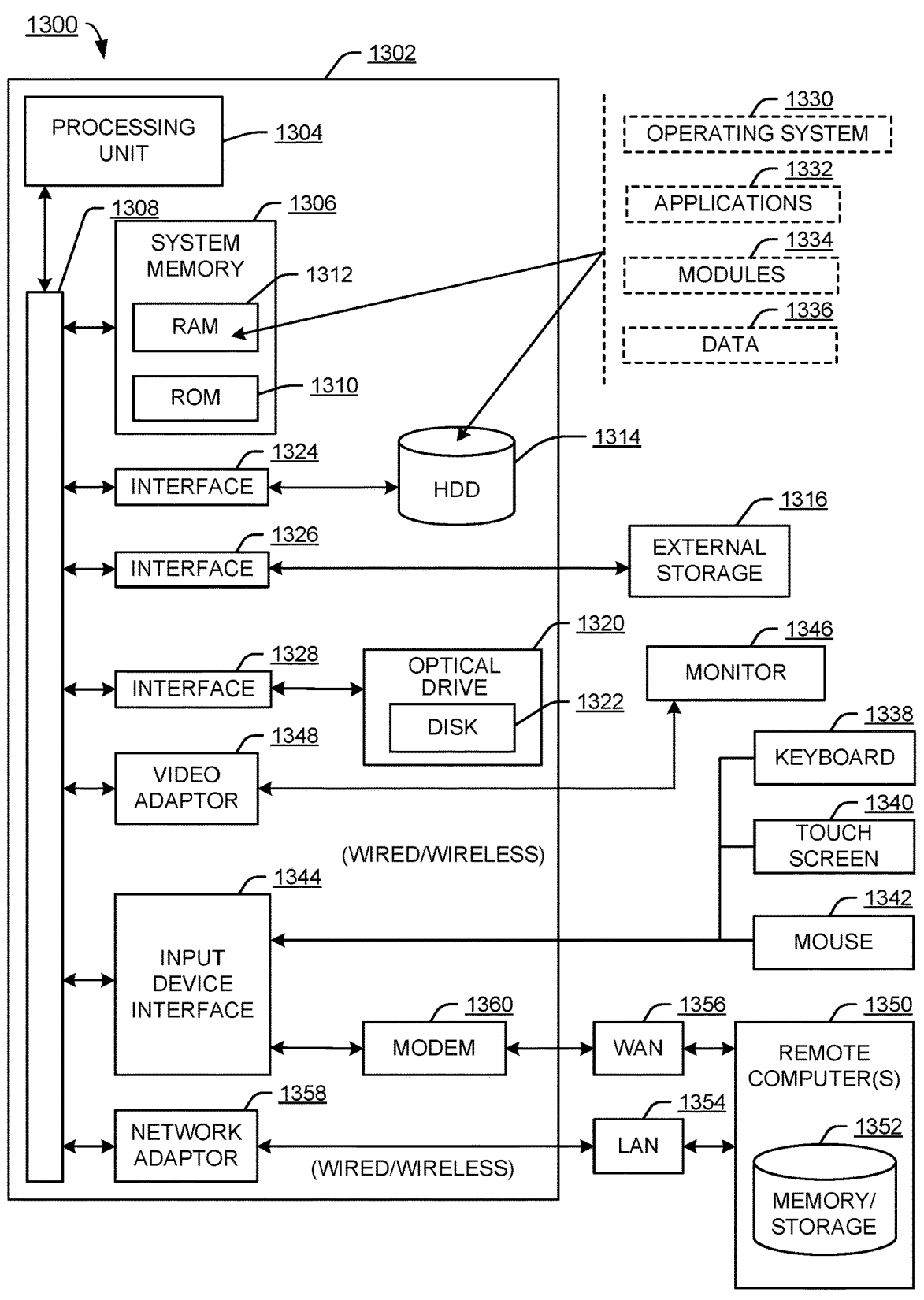
FIG. 13 illustrates an example block diagram of a computer operable to execute an embodiment of this disclosure.

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of gNB 102, Pcell 104, Scell(s) 106, and/or UE 108, of FIG. 1.

In some examples, computing environment 1300 can implement one or more embodiments of the process flows of FIGS. 10-12 to facilitate unequal density DM-RS positions.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s)

1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/ wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/ storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory coupled to the at least one processor, comprising instructions that, in response to execution by the at least one processor, cause the system to perform operations, comprising:

receiving a message from a base station configured to communicate via a group of antenna ports, the message being indicative of conducting uplink communications of broadband cellular communications with the base station according to a first group of differing demodulation reference signal densities, wherein respective demodulation reference signal densities of the first group of differing demodulation reference signal densities correspond to respective antenna ports of the group of antenna ports, wherein a first demodulation reference signal density of the group of differing demodulation reference signal densities used by a first antenna port of the group of antenna ports differs from a second demodulation reference signal density of the group of differing demodulation reference signal densities used by a second antenna port of the group of antenna ports, wherein the first antenna port uses the first demodulation reference signal density concurrently with the second antenna port using the second demodulation reference signal density, wherein respective densities of the respective demodulation reference signal densities indicate respective numbers of demodulation reference signal that are used, and wherein communicating the broadband cellular communications for uplink communications according to the first group of differing demodulation reference signal densities is performed independently of a second group of demodulation reference signal densities that is configured for downlink communications; and using the first group of differing demodulation reference signal densities to further communicate the broadband cellular communications with the base station.

2. The system of claim 1, wherein the uplink communications comprise physical uplink shared channel communications.

3. The system of claim 1, wherein the uplink communications are transmitted via a first channel that carries user data, and independently of a second channel that carries control information.

4. The system of claim 1, wherein the respective demodulation reference signal densities of the first group of differing demodulation reference signal densities differ across a frequency domain of the broadband cellular communications.

5. The system of claim 4, wherein receiving the message from the base station comprises:

receiving, from the base station, a parameter that identifies a vector, wherein respective values of the vector indicate the respective demodulation reference signal densities for respective code division multiplexing groups.

6. The system of claim 5, wherein a number of the code division multiplexing groups is indicated based on a combination of a number of layers parameter and a demodulation reference signal configuration type parameter that are communicated to the system.

7. The system of claim 1, wherein the respective demodulation reference signal densities of the first group of differing demodulation reference signal densities differ across a time domain of the broadband cellular communications.

8. The system of claim 7, wherein receiving the message from the base station comprises:

receiving, from the base station, a parameter that identifies a vector, wherein respective values of the vector indicate the respective demodulation reference signal densities for respective code division multiplexing groups.

9. The system of claim 8, wherein a size of the vector is equal to a number of code division multiplexing groups of the broadband cellular communications.

10. A method, comprising:

facilitating, by a system comprising at least one processor, broadband cellular communications with a base station;

facilitating, by the system, receiving a communication from the base station indicative of communicating an uplink portion of the broadband cellular communications according to a first group of differing demodulation reference signal densities, wherein communicating a downlink portion of the broadband cellular communications is performed according to a second group of demodulation reference signal densities different from the first group of differing demodulation reference signal densities, wherein a first demodulation reference signal density of the group of differing demodulation reference signal densities used by a first antenna port of a group of antenna ports differs from a second demodulation reference signal density of the group of differing demodulation reference signal densities used by a second antenna port of the group of antenna ports, wherein the first antenna port uses the first demodulation reference signal density concurrently with the second antenna port using the second demodulation reference signal density, wherein respective densities of the respective demodulation reference signal densities indicate respective numbers of demodulation reference signal that are used; and after receiving the communication indicative of communicating the uplink portion of the broadband cellular communications according to the first group of differing demodulation reference signal densities, facilitating, by the system, the broadband cellular communications with the base station further according to the first group of differing demodulation reference signal densities.

11. The method of claim 10, wherein a demodulation reference signal density of the first group of differing demodulation reference signal densities is based on channel state information that corresponds to the system.

12. The method of claim 11, wherein the channel state information is based on user equipment feedback from the system.

13. The method of claim 11, wherein the channel state information is based on an uplink-downlink channel reciprocity in a time-division duplex mode.

14. The method of claim 10, wherein a demodulation reference signal density of the first group of differing demodulation reference signal densities is based on user equipment position information of the system.

15. The method of claim 10, wherein a demodulation reference signal density of the first group of differing demodulation reference signal densities is based on user equipment speed information of the user equipment.

16. A non-transitory computer-readable medium comprising instructions that, in response to execution, cause a system comprising at least one processor to perform operations, comprising:

as part of broadband cellular communications with a base station, receiving a communication indicative of using a group of differing demodulation reference signal densities for uplink communications of the broadband cellular communications, wherein a first demodulation reference signal density of the group of differing demodulation reference signal densities used by a first antenna port differs from a second demodulation reference signal density of the group of differing demodulation reference signal densities used by a second antenna port, wherein the first antenna port uses the first demodulation reference signal density concurrently with the second antenna port using the second demodulation reference signal density, wherein respective densities of the respective demodulation reference signal densities indicate respective numbers of demodulation reference signal that are used; and after receiving the communication indicative of using the group of differing demodulation reference signal densities from the base station, conducting the uplink communications with the base station according to the group of differing demodulation reference signal densities.

17. The non-transitory computer-readable medium of claim 16, wherein the group of differing demodulation reference signal densities is a first group of differing demodulation reference signal densities, and wherein the operations further comprise:

conducting downlink communications of the broadband cellular communications with the base station according to a second group of demodulation reference signal densities.

18. The non-transitory computer-readable medium of claim 17, wherein the first group of differing demodulation reference signal densities differs from the second group of demodulation reference signal densities.

19. The non-transitory computer-readable medium of claim 16, wherein the operations further comprise:

mapping the group of differing demodulation reference signal densities for the uplink communications to a group of physical resource blocks, to produce a group of mapped physical resource blocks.

20. The non-transitory computer-readable medium of claim 19, wherein conducting the uplink communications with the base station according to the group of differing demodulation reference signal densities comprises:

conducting the uplink communications with the base station according to the group of mapped physical resource blocks.

\* \* \* \* \*